United States Patent
Ohkawa et al.

[11] Patent Number: 5,815,300
[45] Date of Patent: Sep. 29, 1998

[54] OPTICAL READING APPARATUS HAVING OPTICAL SCANNER FOR SCANNING INFORMATION ON OBJECTS

[75] Inventors: Masanori Ohkawa, Kawasaki; Toshiyuki Ichikawa, Atsugi; Toshimitsu Kumagai, Kawasaki; Yuuichiro Takashima, Machida; Hiroshi Watanuki, Sagamihara; Shinichi Sato, Kawasaki; Mitsuharu Ishii, Hachioji; Yoshitaka Murakawa, Fuchu; Kozo Yamazaki, Hadano; Hiroyuki Ikeda, Yokohama, all of Japan

[73] Assignee: Fujitsu Limited, Kawasaki, Japan

[21] Appl. No.: 932,172

[22] Filed: Sep. 17, 1997

Related U.S. Application Data

[63] Continuation of Ser. No. 274,348, Jul. 13, 1994, abandoned.

[30] Foreign Application Priority Data

Jul. 14, 1993 [JP] Japan .................................. 5-174431

[51] Int. Cl.$^6$ .................................................. G02B 26/08
[52] U.S. Cl. ........................... 359/196; 359/17; 359/216; 235/467
[58] Field of Search .................... 359/198, 200, 359/211, 217, 218, 221, 17, 204, 216, 196; 346/60, 108; 369/44.21, 283, 284; 235/457, 462, 467, 470

[56] References Cited

U.S. PATENT DOCUMENTS

| | | | |
|---|---|---|---|
| 4,548,463 | 10/1985 | Cato et al. | 350/3.71 |
| 4,795,224 | 1/1989 | Goto | 359/211 |
| 4,939,356 | 7/1990 | Rando et al. | 235/467 |
| 5,009,502 | 4/1991 | Shih et al. | 359/1 |
| 5,019,714 | 5/1991 | Knowles | 235/467 |
| 5,103,323 | 4/1992 | Magarinos et al. | 359/19 |
| 5,124,539 | 6/1992 | Krichever et al. | 359/221 |
| 5,140,141 | 8/1992 | Inagaki et al. | 235/462 |

*Primary Examiner*—James Phan
*Attorney, Agent, or Firm*—Armstrong, Westerman, Hattori, McLeland and Naughton

[57] ABSTRACT

An optical reading apparatus includes an optical scanning unit for emitting upward a scanning light beam to be used to optically read information on an article; and a supporting mechanism for supporting the optical scanning unit so that the optical scanning unit is maintained in a space over a surface of a counter in a state where a distance between the optical scanning unit and the surface of the counter is a predetermined length. An optical reading apparatus includes an optical scanning unit for emitting upward a main-scanning light beam to be used to optically read information on an article, and for emitting a sub-scanning light beam in a direction different from a direction in which the main-scanning light beam travels, the sub-scanning light beam being used to optically read information on an article, and a supporting mechanism for supporting the optical scanning unit so that the optical scanning unit is maintained in a space over a surface of a counter in a state where a distance between the optical scanning unit and the surface of the counter is a predetermined length.

20 Claims, 20 Drawing Sheets

FIG. 20

| | | ① QUICK HANDLING OF ARTICLES | ② MOVING OF ARTICLE BASKET | ③ PROTECTION FROM READING BAR CODE OF ARTICLE IN ARTICLE BASKET | ④ HANDLING OF BOAT-SHAPED ARTICLE |
|---|---|---|---|---|---|
| CONVENTIONAL APPARATUS | FIRST TYPE (FIG. 1) | ○ | × | ○ | × |
| | SECOND TYPE (FIG. 2) | × | ○ | ○ | △ |
| | THIRD TYPE (FIG. 3) | × | ○ | × | ○ |
| PRESENT INVENTION | APPARATUS 50 IN FIG. 5 (FIRST EMBODIMENT) | ○ | ○ | ○ | × |
| | APPARATUS 100 IN FIG. 7 (SECOND EMBODIMENT) | ○ | ○ | ○ | ○ |
| | APPARATUS 120 IN FIG. 14 (THIRD EMBODIMENT) | ○ | ○ | ○ | ○ |
| | APPARATUS 140 IN FIG. 16 (FOURTH EMBODIMENT) | ○ | ○ | ○ | ○ |
| | APPARATUS 150 IN FIG. 19 (FIFTH EMBODIMENT) | ○ | ○ | ○ | ○ |

○ : GOOD
△ : ORDINARY
× : BAD 5,815,300

OPTICAL READING APPARATUS HAVING OPTICAL SCANNER FOR SCANNING INFORMATION ON OBJECTS

This application is a continuation of application Ser. No. 08/274,348, filed Jul. 13, 1994, now abandoned.

BACKGROUND OF THE INVENTION (1) Field of the Invention

The present invention generally relates to an optical reading apparatus having an optical scanner for scanning information on objects, and more particularly to an optical reading apparatus having a stationary-type optical scanner for scanning bar codes on articles of trade, which apparatus is used in a POS (Point of Sales) system provided in a store.

(2) Description of the Related Art

Conventional optical reading apparatuses, such as bar code reading apparatus used in the POS system, are classified, based on setting forms of the optical scanners and directions in which scanning light beams travels from the optical scanner, into the following three types.

The first type is referred to as a horizontal setting form and beam upward emission type. This type of bar code reading apparatus is shown, for example, in FIG. 1. Referring to FIG. 1, a scanner unit 20 is horizontally set on the surface of a check-out counter 21. Scanning light 23 travels obliquely upward from a window 22 on the upper surface of the scanner unit 20. An operator takes out each article from an article basket 24 and moves it over the scanner unit 20 in a direction shown by an arrow 25. When an article is moving over the scanner unit 20, a bar code on the article is optically scanned by the scanning light 23 so as to be read. After the bar codes of all the articles have been read, the article basket 24 which is empty is moved over the scanner unit 20 as shown by an arrow 26.

The second type is referred to as a vertical setting form and beam frontward emission type. This type of bar code reading apparatus is shown, for example, in FIG. 2. Referring to FIG. 2, a scanner unit 30 stands on the check-out counter 21 so that a window 31 of the scannerunit 30 is vertical to the surface of the check-out counter 21. Scanning light 32 travels frontward (toward an operator) from the window 31. The operator takes out each article from the article basket 24 and moves each article, in a direction shown by an arrow 33, while positioning it in such a way that a bar code thereon faces the scanner unit 30. When each article passes through an area in front of the scanner unit 30, the bar code thereon is read. After the bar codes of all articles have been read, the article basket 24 which is empty is moved so as to slide on the check-out counter 21 as shown by an arrow 34.

The third type is referred to as an overhead setting form and beam downward emission type. This type of bar code reading apparatus is shown, for example, in FIG. 3. Referring to FIG. 3, a scanner unit 40 is supported by a post 41 as to be located above the check-out counter 21. A window from which scanning light 43 travels faces the surface of the check-out counter 21. That is, the scanning light 43 travels downward from the window 42 of the scanner unit 40. The operator takes out each article from the article basket 24 and moves each article, in a direction shown by an arrow 44, while positioning it in such a way that a bar code thereon is directed upward to face the scanner unit 40. After the bar codes of all the articles have been read, the article basket 24 which is empty is moved so as to slide on the check-out counter 21 as shown by an arrow 45.

In the first type of conventional bar code reading apparatus as shown in FIG. 1, there is no obstacle above the scanner unit 20, so that the operator can move articles more quickly than in the cases of the second and third types of conventional bar code reading apparatuses as shown in FIGS. 2 and 3. In addition, since the scanning light 23 travels upward from the article basket 24, the scanning light 23 does not enter the article basket 24, thus preventing articles from being mistakenly read.

In the second and third types of conventional bar code reading apparatuses as shown in FIGS. 2 and 3, the article basket 24 can be moved so as to slide on the check-put counter 21 without hitting the article basket 24 on the scanner unit 30 or 40.

In the first and second types of conventional bar code reading apparatuses as shown in FIGS. 1 and 2, handling of a boat-shaped article as shown in FIG. 4 is inferior. A boat-shaped article 12 as shown in FIG. 4 is formed of a dish 10 in which food, such as raw fish or meat, is put and a wrapping sheet 11 by which the dish 10 is wrapped. A bar code label 13 on which a bar code is formed is attached to the wrapping sheet 11. When the boat-shaped article 12 is scanned by the first type of conventional bar code reading apparatus, the boat-shaped article 12 must be upside down so that the bar code label 13 faces the scanner unit 20. Thus, there is a case where the food in the dish 10 is deformed and/or food juice leaks out of the dish 10. When the boat-shaped article 12 is scanned by the second type of conventional bar code reading apparatus, the boat-shaped article 12 must be inclined so that the bar code label 13 faces the scanner unit 30. Thus, in this case, the same problem as in the case of the first type of conventional bar code reading apparatus occurs.

In addition, in the third type of conventional bar code reading apparatus, if the article basket 24 is mistakenly moved under the scanner unit 40, the scanning light 43 enters the article basket 24. In this case, bar codes on other articles in the article basket 24 are mistakenly read.

SUMMARY OF THE PRESENT INVENTION

Accordingly, a general object of the present invention is to provide a novel and useful optical reading apparatus in which the disadvantages of the aforementioned prior art are eliminated.

A more specific object of the present invention is to provide an optical reading apparatus in which the handling of articles to be scanned thereby can be quickly carried out.

Another object of the present invention is to provide an optical reading apparatus in which, after all articles in an article basket have been optically scanned, the handling of the article basket which is empty is superior.

Another object of the present invention is to provide an optical reading apparatus in which information on articles in an article basket is prevented from being mistakenly read thereby.

The above objects of the present invention are achieved by an optical reading apparatus comprising: an optical scanning unit for emitting upward a scanning light beam to be used to optically read information on an article; and a supporting mechanism for supporting the optical scanning unit so that the optical scanning unit is maintained in a space over a surface of a counter in a state where a distance between the optical scanning unit and the surface of the counter is a predetermined length.

Above objects of the present invention are also achieved by an optical reading apparatus comprising: an optical scanning unit for emitting upward a main-scanning light beam to be used to optically read information on an article, and for emitting a sub-scanning light beam in a direction different from a direction in which the main-scanning light beam travels, the sub-scanning light beam being used to optically read information on an article; and a supporting mechanism for supporting the optical scanning unit so that the optical scanning unit is maintained in a space over a surface of a counter in a state where a distance between the optical scanning unit and the surface of the counter is a predetermined length.

According to the present invention, since the information on the article can be read by the scanning line while the article is being moved over the optical scanning unit, the handling of the article to be scanned can be quickly carried out. In addition, after all articles in an article basket (the container) have been optically scanned, the article basket which is empty can be moved under the optical scanning unit so as to be slide on the counter. Thus, the handling of the article basket (the container) is superior. Further, since the scanning light beam travels upward from the optical scanning unit, information on articles in the article basket (the container) is prevented from being mistakenly read thereby.

Another object of the present invention is provide an optical reading apparatus which can be set on a counter in various setting forms.

The object of the present invention is achieved by an optical reading apparatus comprising: a scanning light beam generating system for generating a scanning light beam used to optically read information on an article; and an optical system for changing a readable region in which the information on the article can be read by the scanning light beam generated by the scanning light beam generating system.

According to the present invention, since the readable position can be changed, the optical scanning apparatus can be set on the counter in various setting forms in accordance with readable positions. As a result, in a case where a plurality of types of optical scanning apparatuses having different readable positions are provided, the production cost of each type of optical scanning apparatus can be decreased.

Additional objects, features and advantages of the present invention will become apparent from the following detailed description when read in conjunction with the accompanying drawings.

BRIEF DESCRIPTION OF THE DRAWINGS

FIG. 20 is a table illustrating evaluation of bar code recording apparatuses according to the present invention in comparison with conventional bar code recording apparatuses.

DESCRIPTION OF THE PREFERRED EMBODIMENTS

Figure 5:
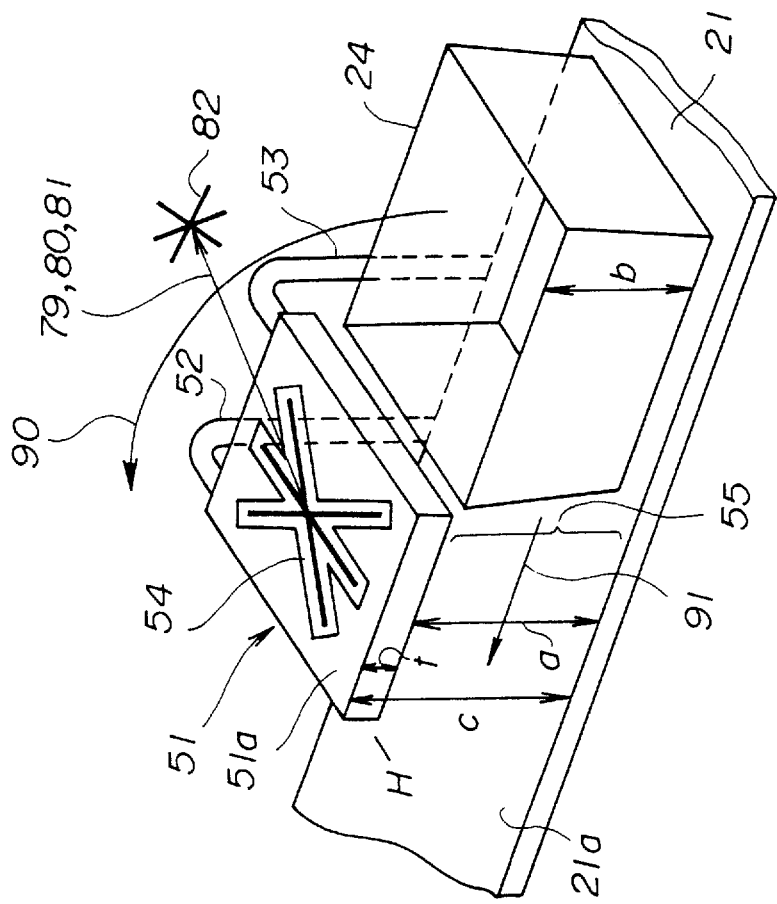
FIG. 5 is perspective view illustrating a bar code reading apparatus according to a first embodiment of the present invention.
Figure 6:
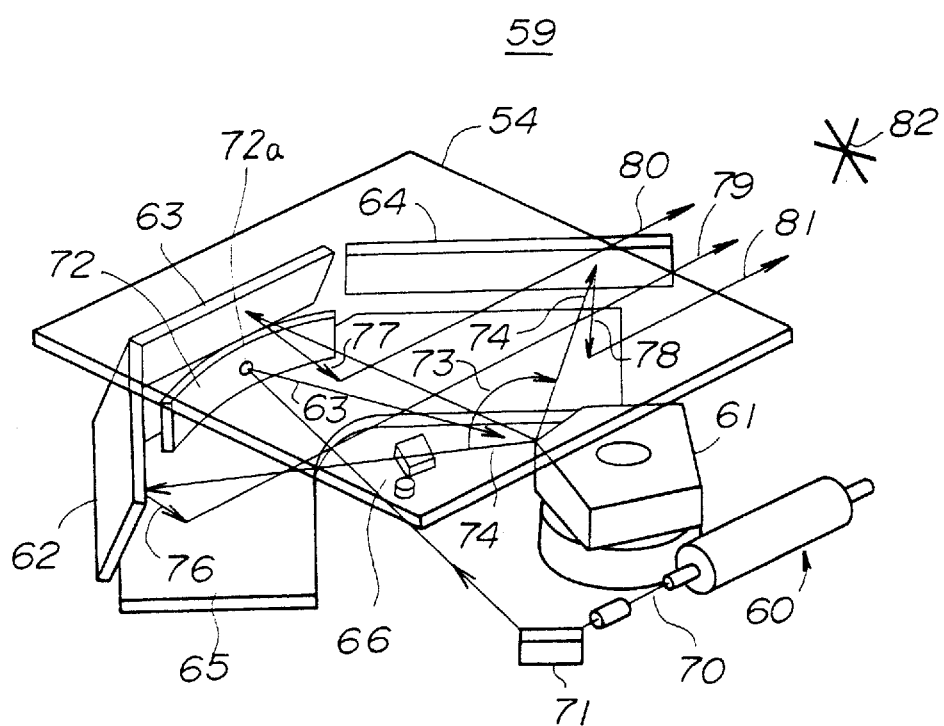
FIG. 6 is a diagram illustrating the structure of an optical system in a scanner body of the bar code reading apparatus shown in FIG. 5.

A description will now given, with reference to FIGS. 5 and 6, of a first embodiment of the present invention.

Referring to FIG. 5, a bar code reading apparatus 50 has a scanner unit 51. The scanner unit 51 is supported by posts 52 and 53 so as to be located at a height H above the check-out counter 21. A lower surface of the scanner unit 51 is at a distance a from a surface 21a of the check-out counter 21. The distance a between the lower surface of the scanner unit 51 and the surface 21a of the check-out counter 21 is slightly greater than a height b of an article basket 24. That is, a space 55 through which the article basket 24 can pass is formed between the scanner body 51 and the check-out counter 21. The posts 52 and 53 supporting the scanner unit 51 are located on a side of the check-out counter 21 opposite to a side on which an operator stands so as to be out of the operator's way during check-out operations. The scanner unit 51 has a reading window 54 formed on an upper surface 51a thereof.

An optical system 59 as shown in FIG. 6 is mounted inside the scanner unit 51. Referring to FIG. 6, the optical system has a laser source 60, a polygonal mirror 61 for moving a scanning laser beam, reflection mirrors 62, 63 and 64, a bottom surface mirror 65, a detector 66, a reflection mirror 71 and a concave mirror 72 having an incident area 72a. The reflection mirrors 62, 63 and 64 and the bottom surface mirror 65 are used to divide a scanning laser beam.

A laser beam 70 emitted from the laser source 60 travels to the polygonal mirror 61 via the reflection mirror 71 and the incident area 72a of the concave mirror 72. The laser beam 70 reflected by each surface of the polygonal mirror 61 is swung by the rotation of the polygonal mirror 61 in a direction shown by an arrow 73 so that a scanning laser beam 74 is made. The scanning laser beam 74 scans the reflection mirrors 62, 63 and 64 in this order, so that the scanning laser beam 74 is divided into scanning laser beams 76, 77 and 78 by the reflection mirrors 62, 63 and 64. The respective scanning laser beams 76, 77 and 78 are reflected by the bottom surface mirror 65, and reflected scanning laser beams 79, 80 and 81 travel toward the scanning window 54. The scanning laser beams 79, 80 and 81 are then emitted through the scanning window 54 and travel obliquely upward from the scanning window 54 as shown in FIG. 5. The scanning laser beams 79, 80 and 81 move in different directions so that a star-shaped scanning line pattern 82 having three lines is formed in a space above the scanner body 51.

When an article is brought into the space in which the scanning line pattern 82 is formed so that the scanning laser beams 79, 80 and 81 are projected onto a surface of the article on which a bar code is formed, the scanning laser beams 79, 80 and 81 are scattered by the surface having the bar code. A part of the scattered beam including information of the bar code enters the scanner unit 51 through the scanning window 54 and then returns along the same optical path as that of the laser beam in a direction opposite to that in which the laser beams travel. The returning beam is focused on the detector 66 by the concave mirror 72. Based on a detecting signal output from the detector 66, information corresponding to the bar code on the article is generated. That is, the bar code is read.

In the bar code reading apparatus shown in FIG. 5, first, an article is taken out from the article basket 24. Next, the article, which is positioned in such a way that the surface having the bar code is facing downward, is moved over the scanner unit 51 as shown by an arrow 90. The article is then brought into a receiving basket (not shown). A series of the above operations is repeated in the check-out operation. While each article is being moved, a bar code formed on each article is read by the bar code reading apparatus.

In the bar code reading apparatus shown in FIG. 5, there is no obstacle above the scanner unit 51, so that the operator can carry out the check-out operation without the inconvenience of any obstacles. Thus, the operator can quickly move articles from the article basket 24 to the receiving basket.

The thickness (t) of the scanner unit 51 is slight, so that the distance (c) between the upper surface 51a of the scanner unit 51 and the surface 21 of the check-out counter 21 is slightly greater than the height (b) of the article basket 24. Thus, the operator can move each article over the scanner unit 51 without deterioration of the working efficiency. In addition, the scanning laser beams 79, 80 and 81 are emitted upward from a position higher than the article basket 24, so that bar codes on articles in the article basket 24 are not mistakenly scanned by the scanning laser beams 79, 80 and 81. The operator can slide the article basket 24 which is empty on the surface 21a of the check-out counter 21 under the scanner unit 51, as shown by an arrow 91. The article basket 24 is thus moved under the scanner unit 51 to a position at which the article basket 24 which is empty can be used as a receiving basket.

Figure 7:
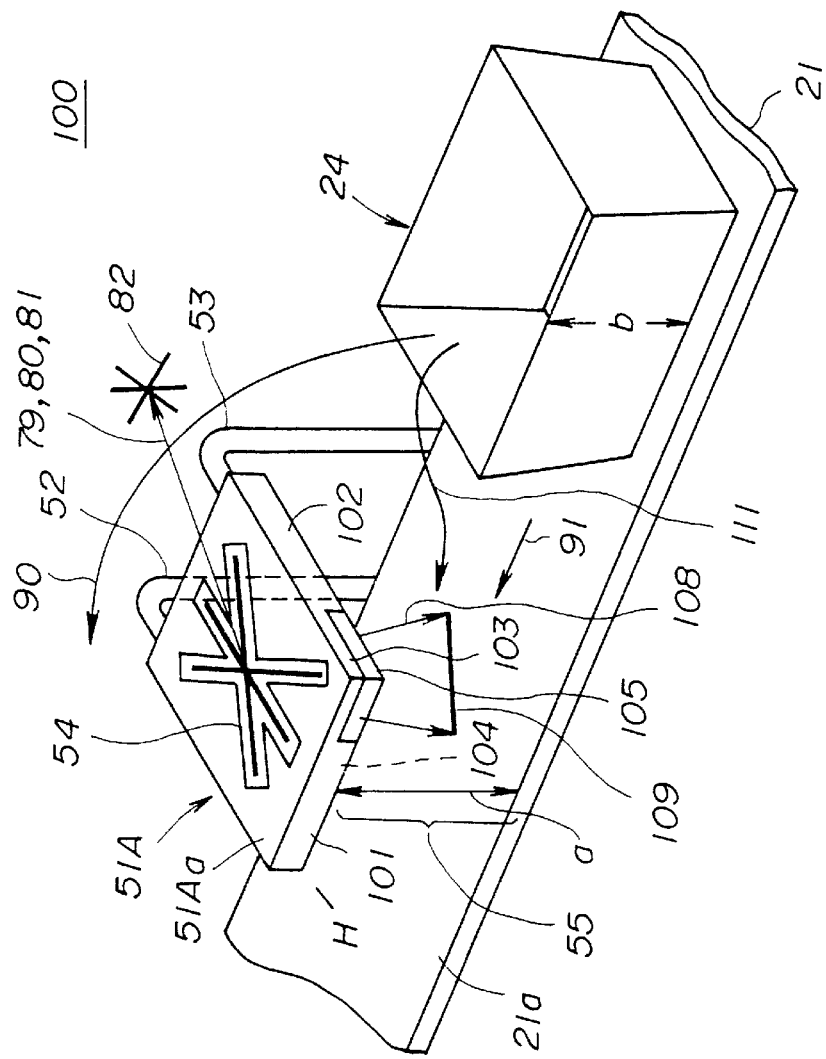
FIG. 7 is a perspective view illustrating a bar code reading apparatus according to a second embodiment of the present invention.
Figure 8:
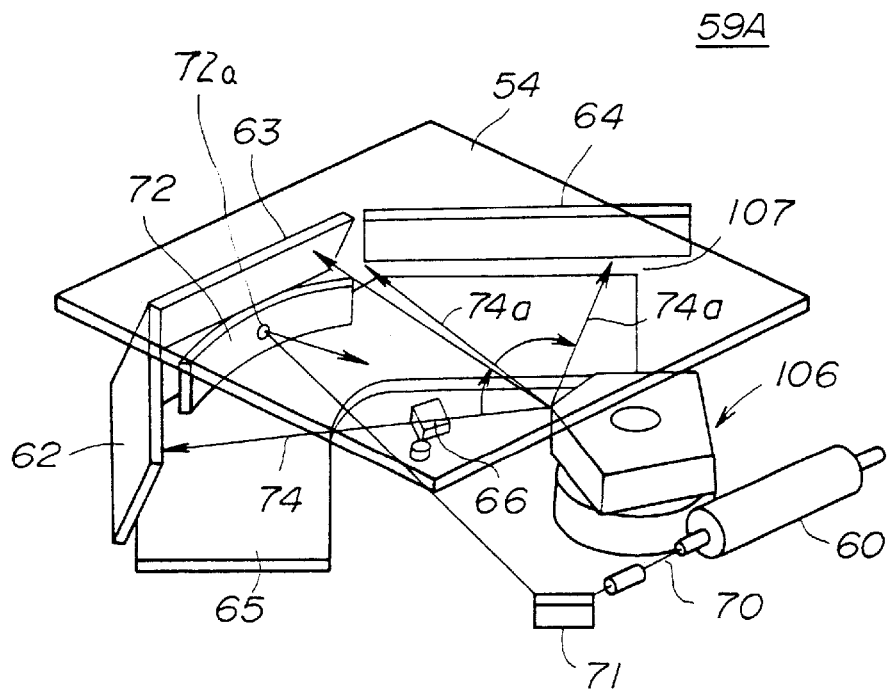
FIG. 8 is a diagram illustrating the structure of an optical system in a scanner unit of the bar code reading apparatus shown in FIG. 7
Figure 9:
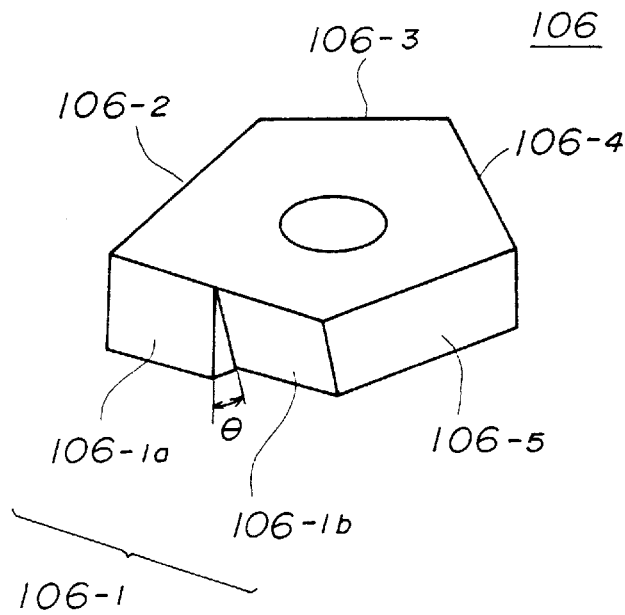
FIG. 9 is a perspective view illustrating a polygonal mirror used in the optical system shown in FIG. 8.

A description will now be given, with reference to FIGS. 7, 8 and 9, of a second embodiment of the present invention. In FIGS. 7 and 8, those parts which are the same as those shown in FIGS. 5 and 6 are given the same reference numbers.

Referring to FIG. 7, a bar code reading apparatus 100 has a scanner unit 51A supported by the posts 52 and 53 in the same manner as that shown in FIG. 5. The scanner unit 51A has the window 54 formed on an upper surface 51Aa thereof and a sub-window 105. The sub-window 105 is formed so as to be extend from a corner portion 103, at which front and side surfaces 101 and 102 of the scanner unit 51A are joined to each other, to a lower surface 104.

An optical system 59A shown in FIG. 8 is mounted in the scanner unit 51A. Referring to FIG. 8, the optical system 59A has elements the same as the optical system 59 shown in FIG. 6, except that a polygonal mirror 106 and a space 107 between the reflection mirror 64 and the bottom surface mirror 65 are additionally provided. The polygonal mirror 106 is a pentagonal prism as shown in FIG. 9. Referring to FIG. 9, the polygonal mirror 106 has five surfaces $106_{-1}$–$106_{-5}$ each of which corresponds to one of surfaces of the pentagonal prism. A surface $106_{-1}$ which is one of the five surfaces $106_{-1}$–$106_{-5}$ is divided into two surfaces $106^{-1a}$ and $106_{-1b}$. The surface $106_{-1a}$ has the same inclination as the other surfaces $106_{-2}$–$106_{-5}$, and the surface $^{106}{}_{-1b}$ is inclined so that an angle between the surfaces $106_{-1a}$ and $106_{-1b}$ is maintained at $\Theta$. The scanning laser beam 74 generated by reflection on the surfaces $106_{-2}$–$106_{-5}$ scans all three of the reflection mirrors 62, 63 and 64. The scanning laser beam 74 generated by reflection on the surface $106_{-1a}$ only scans two out of the three reflection mirrors 62, 63 and 64, that is, the mirrors 62 and 63. A scanning laser beam 74a generated by reflection on the surface $106_{-1b}$ travels obliquely downward from a plane on which the scanning laser beam 74 travels to the space 107 between the reflection mirror 64 and the bottom surface mirror 65. The scanning laser beam 74a passes through the space 107 and travels to the sub-window 105 of the scanner unit 51. As a result, a scanning beam 108 (corresponding to the scanning laser beam 74a) travels, as a sub-scanning laser beam, obliquely downward from the sub-window 105 as shown in FIG. 7. The scanning beam 108 forms a scanning line pattern 109 at a predetermined position above the surface 21a of the check-out counter 21.

The scanning laser beam 74 from the surfaces $106_{-2}$–$106_{-5}$ and $106_{-1a}$ of the polygonal mirror 106 is reflected by the bottom surface mirror 65, so that the divided scanning laser beams 79, 80 and 81 travel, as main scanning laser beams, obliquely upward from the window 54, in the same manner as in the first embodiment. That is, the laser scanning line pattern 82 is formed in a space above the scanner unit 51.

Figure 4:
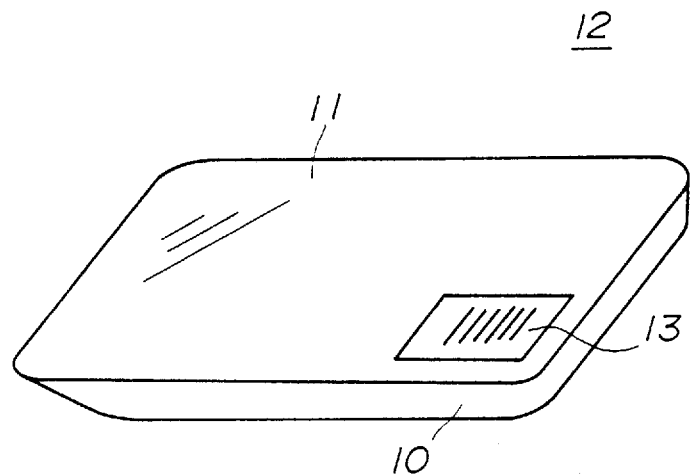
FIG. 4 is a perspective view illustrating a boat-shaped article.

In the bar code reading apparatus 100 shown in FIG. 7, the operator takes out each article from the article basket 24 and moves it over the scanner unit 51 as shown by the arrow 90 so that a bar code on each article is scanned by the scanning laser beams 79, 80 and 81. As a result, the bar code on each article is optically read. In addition, the operator moves a boat-shaped article as shown in FIG. 4 so that the boat-shaped article passes under the scanner unit 51 as shown by an arrow 111. In this case, the boat-shaped article is maintained in such a position that the dish 10 is facing downward and the bar code label 13 is facing upward. Thus, the bar code on the boat-shaped article is scanned by the scanning laser beam 108 under a condition in which the food in the dish 10 is not deformed and/or food juice does not leak out of the dish 10.

The scanning line pattern 109 based on the scanning laser beam 108 traveling downward from the sub-window 105 has a small size, so that there is almost no case where bar codes on articles in the article basket 24 are mistakenly read by the scanning laser beam 108. The operator slides the article basket 24 which is empty on the surface 21a of the check-out counter 21 under the scanner unit 51 as shown by the arrow 91.

A description will now be given, with reference to FIGS. 10–13, of modifications of the optical system shown in FIG. 8. IN FIGS. 10–13, those parts which are the same as those shown in FIGS. 6 and 8 are given the same reference numbers, and the explanation of those parts will be omitted.

Figure 10:
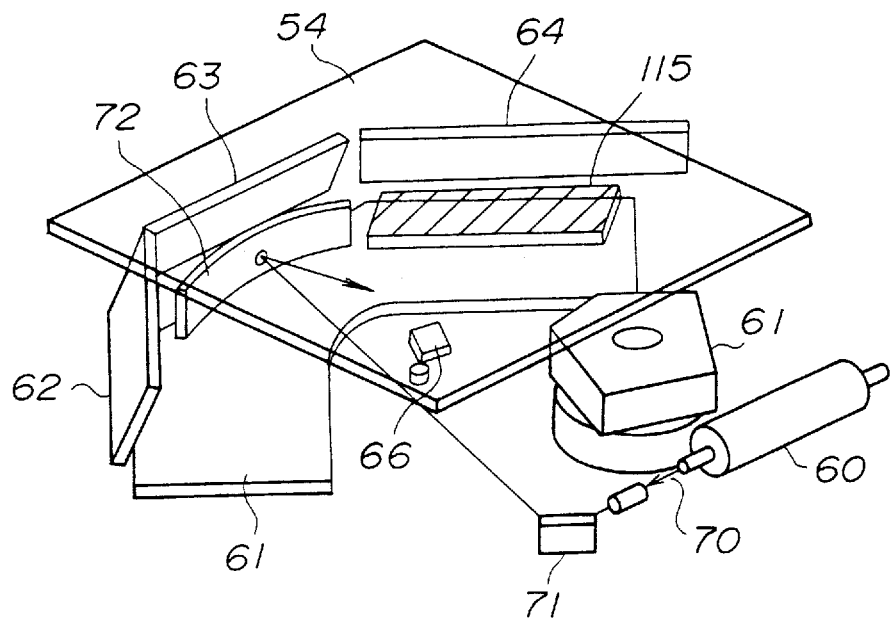
FIG. 10 is a diagram illustrating a first modification of the optical system shown in FIG. 8.
Figure 11:
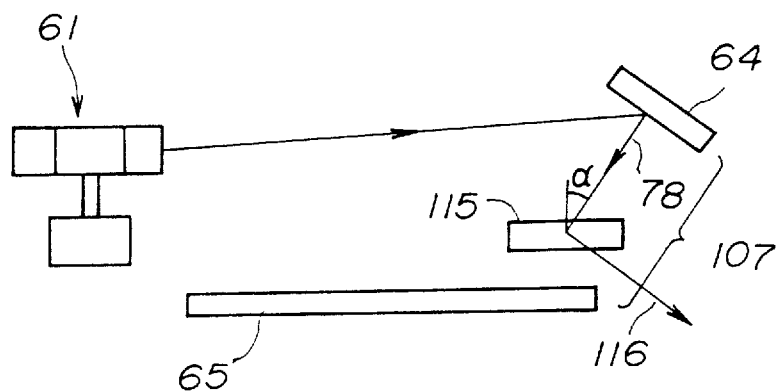
FIG. 11 is a diagram illustrating the operation of a transmission type hologram in the optical system shown in FIG. 10.

An optical system 59B according to a first modification is shown in FIG. 10 and 11. Referring to FIGS. 10 and 11, the optical system 59B is provided with the normal polygonal mirror 61 used in the first embodiment and a transmission hologram plate 115 which is located between the reflection mirror 64 and the bottom surface mirror 65. The transmission hologram plate 115 is located so that the Bragg angle of the hologram is equal to an incident angle at which the scanning laser beam 78 from the reflection mirror 64 is incident to the transmission hologram plate 115. Thus, the scanning laser beam 78 is diffracted by the transmission hologram plate 115, so that a diffraction scanning laser beam 116 is emitted from a transmission hologram plate 115 as shown in FIG. 11. The diffraction scanning laser beam 78 from the transmission hologram plate 115 passes through the space 107 between the reflection mirror 64 and the bottom surface mirror 65 and travels to the sub-window 105. The diffraction scanning laser beam 116 travels, as the scanning laser beam 108, obliquely downward from the sub-window 105.

Figure 12:
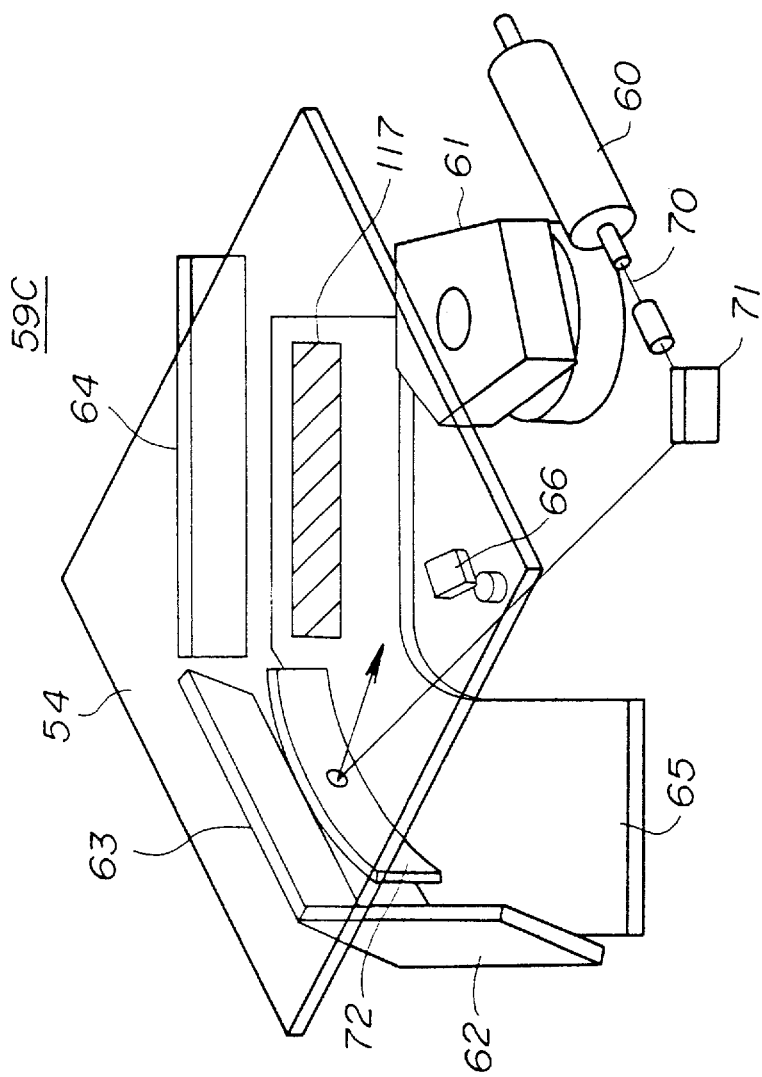
FIG. 12 is a diagram illustrating a second modification of the optical system shown in FIG. 8.
Figure 13:
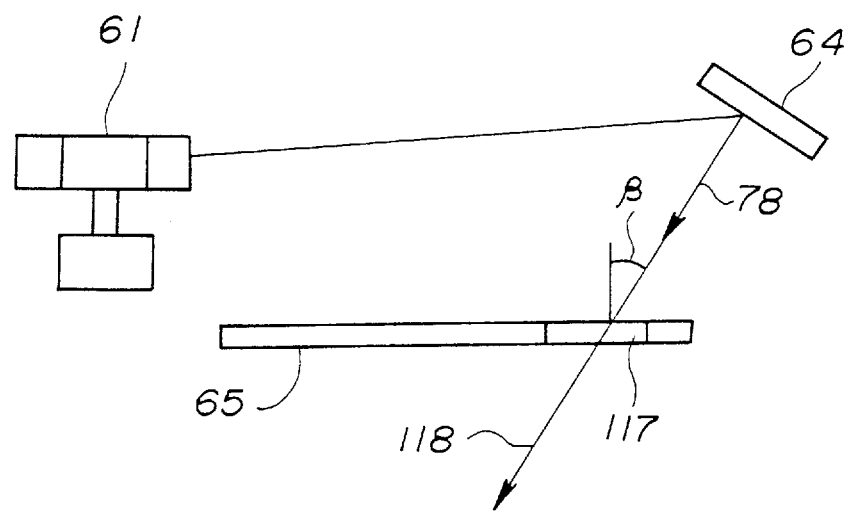
FIG. 13 is a diagram illustrating the operation of a transmission type hologram in the optical system shown in FIG. 12.

An optical system 59C according to a second modification is shown in FIGS. 12 and 13. Referring to FIGS. 12 and 13, a reflection hologram plate 117 is substituted for the transmission hologram plate 115. The reflection hologram plate 117 is built inside the bottom surface mirror 65. An incident angle β of the scanning laser beam 78 from the reflection mirror 64 with respect to the reflection hologram plate 117 greatly differ from the Bragg angle of the reflection hologram plate 117. Thus, the scanning laser beam 78 from the reflection mirror 64 passes through the reflection hologram plate 117, and a passing laser beam 118 travels from the reflection hologram plate 117 toward the sub-window 105 of the scanner unit 51 shown in FIG. 7. The passing laser beam 118 travels, as the scanning laser beam 108, obliquely downward from the sub-window 105.

Figure 14:
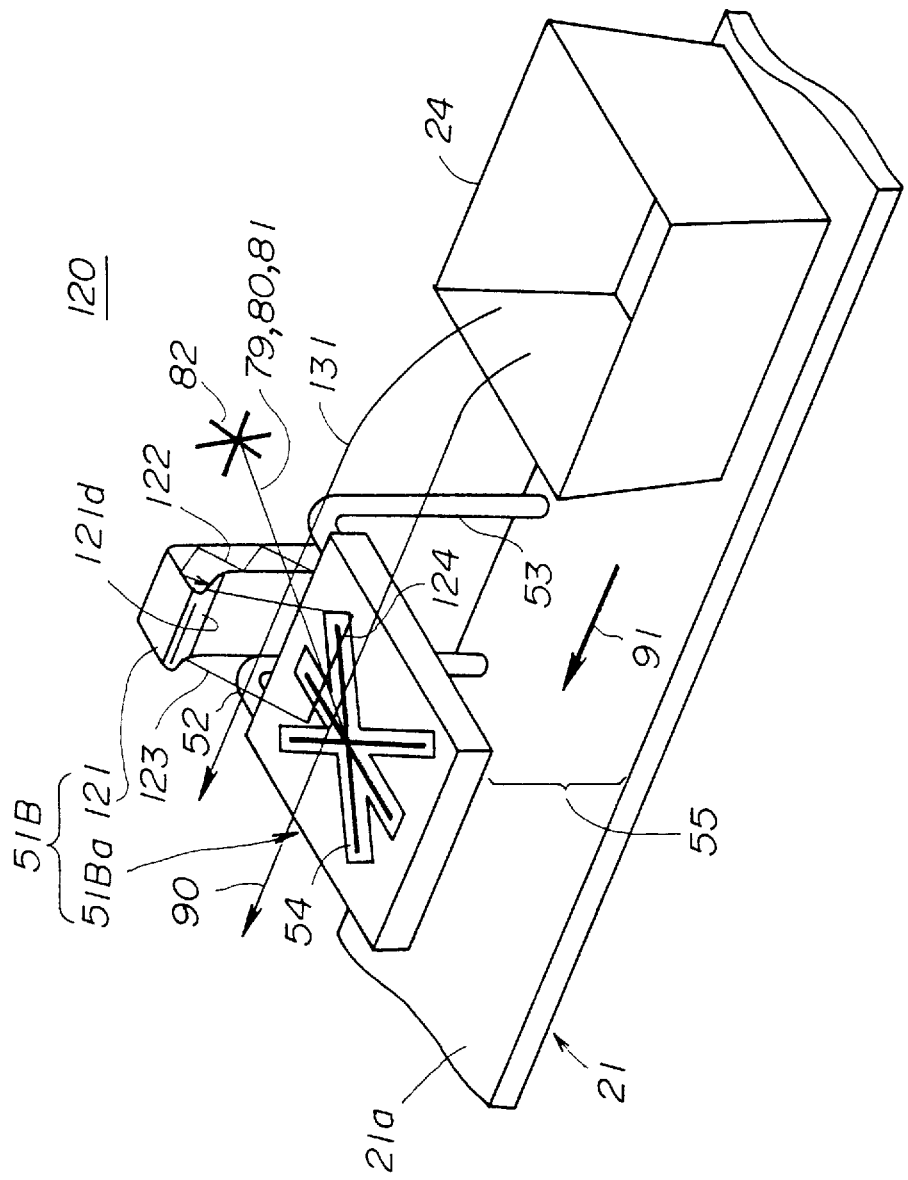
FIG. 14 is a perspective view illustrating a bar code reading apparatus according to a third embodiment of the present invention.
Figure 15:
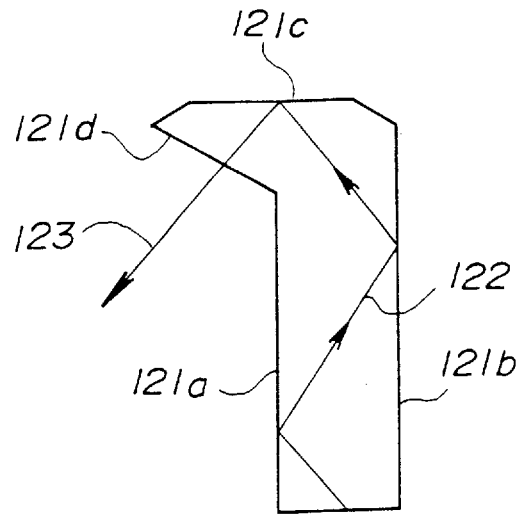
FIG. 15 is a diagram illustrating an optical guide plate provided in the bar code reading apparatus shown in FIG. 14.

A description will now be given, with reference to FIGS. 14 and 15 of a third embodiment of the present invention. In FIG. 14, those parts which are the same as those shown in FIG. 5 are given the same reference numbers.

Referring to FIG. 14, a bar code reading apparatus 120 has a scanner unit 51B supported by the posts 52 and 53. The scanner unit 51B is formed of a main body 51Ba and an optical guide unit 121. The optical guide unit 121 extends upward from a side of the main body 51Ba supported by the posts 52 and 53. The optical guide unit 121 has side wall surfaces 121a and 121b opposite to each other and a top surface 121c. A laser beam is alternately reflected by the side wall surfaces 121a and 121b so that the laser beam is directed from the bottom to the top surface 121c. The optical guide unit 121 has a surface located at an upper portion thereof which functions as a window 121d through which the laser beam reflected by the top surface 121c travels obliquely downward from the top surface 121c. Either the optical system 59A shown in FIG. 8, the optical system 59B shown in FIG. 10 or the optical system 59C shown in FIG. 12 is mounted in the main body 51Ba.

In FIG. 14, the scanning laser beams 79, 80 and 81 travel obliquely upward from the window 54 so that the scanning line pattern 82 is formed in the space above the scanner unit 51B. In addition, for example, in a case where the optical system 59A shown in FIG. 8 is mounted in the main body 51Ba, the scanning laser beam 74a passes through the space 107 between the reflection mirror 64 and the bottom surface mirror 65 and is directed to the optical guide unit 121. The scanning laser beam directed to the optical guide unit 121 is propagated through the optical guide unit 121 from the bottom toward the top surface 121c as a beam 122 shown in FIG. 15. The laser beam reflected by the top surface 121c travels obliquely downward therefrom. and passes through the window 121d. The scanning laser beam 123 emitted from the window 121d of the optical guide unit 121 travels obliquely downward so that a scanning line pattern 124 is formed above the scanner unit 51B as shown in FIG. 14.

In the bar code reading apparatus 120 as shown in FIG. 14, the operator moves a normally shaped article over the scanner unit 51B as shown by the arrow 90 so that an bar code on the normally shaped article is scanned by the scanning laser beams 79, 80 and 81. In the case of a boat-shaped article, the operator moves the boat-shaped article over the scanner unit 51B so that the dish 10 is facing downward and the bar code label is facing upward. In this case, the boat-shaped article is moved along a path 131 near the optical guide unit 121 so that a bar code formed on the bar code label 13 of the boat-article is scanned by the scanning laser beam 123.

The article basket 24 which is empty is moved so as to slide on the surface 21a of the check-out counter 21 under the scanner unit 51B as shown by the arrow 91.

In this embodiment, furthermore, since, in addition to normally shaped articles, the boat-shaped article as shown in FIG. 4 can also be moved over the scanner unit 51 to scan a bar code thereon, the check-out operation can be performed more efficiently than in the cases of the first and second embodiments.

Figure 16:
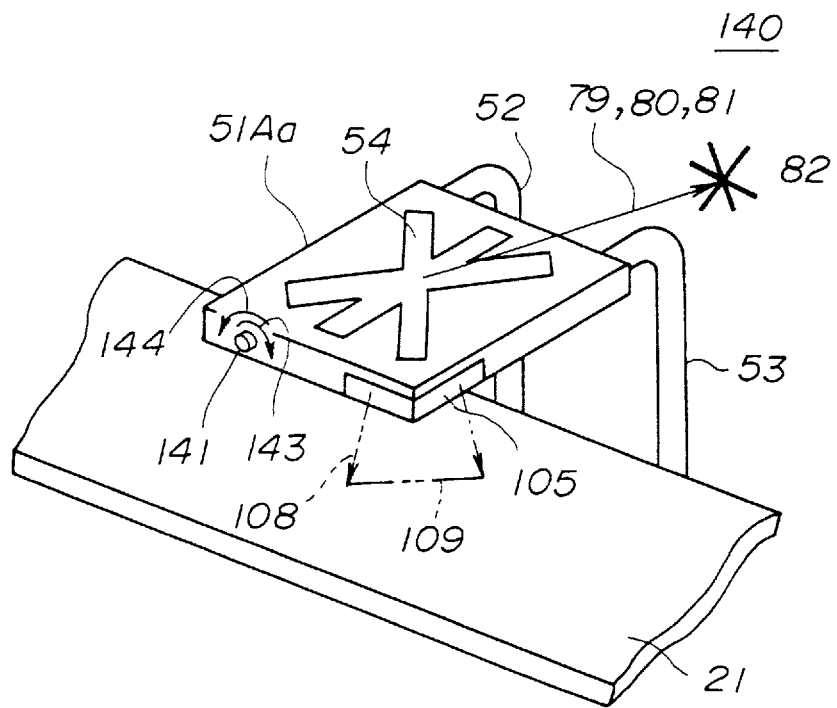
FIG. 16 is a perspective view illustrating a bar cord reading apparatus according to a fourth embodiment of the present invention.
Figure 17:
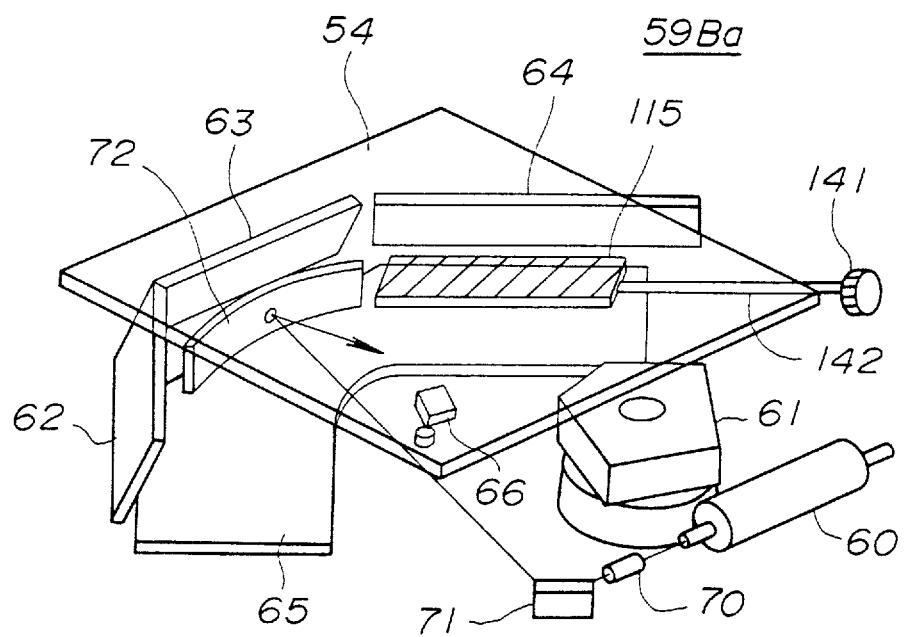
FIG. 17 is a diagram illustrating the structure of an optical system in a scanner unit shown in FIG. 16.

A description will now be given, with reference to FIGS. 16, 17, 18A and 18B, of a fourth embodiment of the present invention. In FIG. 16 and 17, those parts which are the same as those shown in FIGS. 7 and 10 are given the same reference numbers, and the explanation of those parts will be omitted.

Referring to FIG. 16, a bar code reading apparatus 140 has a scanner unit 51Aa supported by the posts 52 and 53. The scanner unit 51Aa has a selecting operation nob 141 located on the front surface of the scanner unit 51Aa. An optical system 59Ba as shown in FIG. 17 is mounted in the scanner unit 51A*a*. Referring to FIG. 17, the transmission hologram plate 115 is fixed on a tip end of a rod 142, and is supported so as to be rotatable within a predetermined angle range. The operation nob 141 is fixed on an opposite end of the rod 142.

Figure 18A:
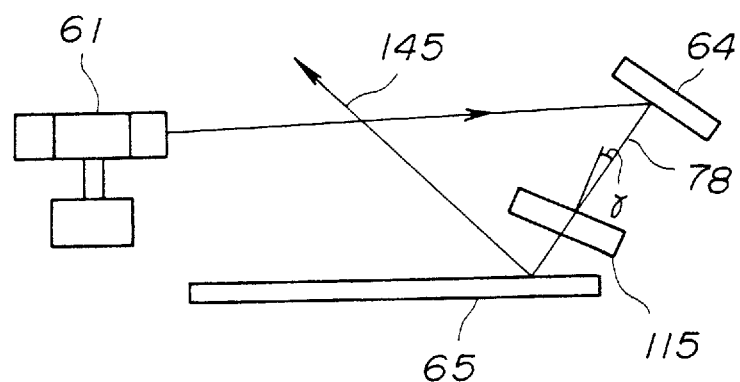
FIG. 18A is a diagram illustrating the optical system shown in FIG. 17 in a normal state.

In a normal case, the operation nob 141 is rotated in a direction shown by an arrow 143 (the clockwise direction), so that the transmission hologram plate 115 is maintained in a state as shown in FIG. 18A. In this state, the incident angle Y of the laser beam 78 from the reflection mirror 64 with respect to the transmission hologram plate 115 greatly differs from the Bragg angle of the transmission hologram plate 115. Thus, the laser beam 78 passes through the transmission hologram plate 115, and is then reflected by the bottom surface mirror 65. The reflected beam 145 travels upward from the bottom surface mirror 65. As a result, the scanning laser beams 79, 80 and 81 based on the reflected beam 145 are emitted from the window 54 on the upper surface of the scanner unit 51A*a* and travel obliquely upward therefrom so that scanning line pattern 82 is formed. When articles are moved over the scanner unit 51A*a*, bar codes thereon are read. In this case, no laser beam is emitted from the window 105. Thus, bar codes on articles in the article basket 24 are not read at all.

Figure 18B:
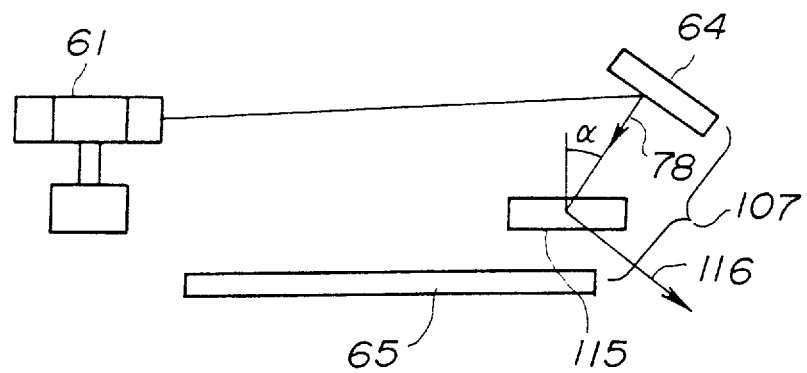
FIG. 18B is a diagram illustrating the optical system shown in FIG. 17 is a state where boat-shaped articles are handled.

In the case of handling boat-shaped articles, the operation nob 141 is rotated in a direction shown by an arrow 144 (the counterclockwise direction), so that the transmission hologram plate 115 is maintained in a state as shown in FIG. 18B. In this state, the incident angle α of the laser beam 78 from the reflection mirror 64 with respect to the transmission hologram plate 115 is equal to the Bragg angle of the transmission hologram plate 115. Thus, the laser beam 78 is diffracted by the transmission hologram plate 115. The diffracted laser beam 116 travels obliquely downward from the transmission hologram plate 115. The diffracted laser beam 116 passes through the space 107 between the reflection mirror 64 and the bottom surface mirror 65 and is emitted as the scanning laser beam 108 from the window 105. The scanning laser beam 108 travels obliquely downward from the window 105 so that the scanning line pattern 109 is formed. When the operator moves a boat-shaped article under the scanner unit 51A*a* so that the dish 10 is facing downward and the bar code label 13 is facing upward, a bar code formed on the bar code label 13 is scanned by the scanning laser beam 108 so as to be optically read.

A description will now be given, with reference to FIG. 19, of a fifth embodiment of the present invention.

Figure 19:
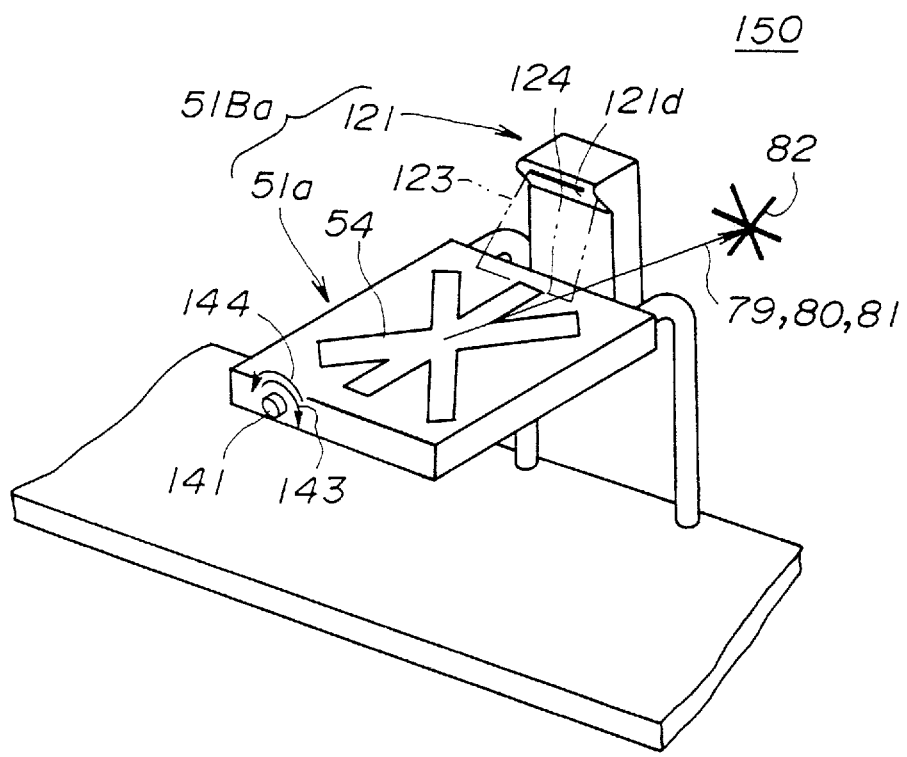
FIG. 19 is a perspective view illustrating a bar code reading apparatus according to a fifth embodiment of the present invention.

Referring to FIG. 19, a bar code reading apparatus 150 has a scanner unit 51B*a* supported by the posts 52 and 53. The scanner unit 51B*a* is formed of a main body 51*a* and the optical guide unit 121 mounted on the main body 51*a*. The optical system 59B*a* as shown in FIG. 17 is mounted in the main body 51*a*.

In a normal case, the scanning laser beams 79, 80, and 81 travel obliquely upward from the window 54 of the main body 51*a* so that the scanning line pattern 82 is formed in the space above the main body 51*a*. In this case, no laser beam is emitted from the optical guide unit 121.

When the operation nob 141 is rotated in the direction shown by the arrow 144 (the counterclockwise direction), the laser beam reflected by the reflection mirror 64 passes through the transmission hologram plate 115 and travels to the optical guide unit 121. The laser beam is propagated through the optical guided unit 121 and emitted from the window 121*d* thereof. As a result, the scanning laser beam 123 travels obliquely downward from the window 121*d* so that the scanning line pattern 124 is formed in the space above the main body 51*a*.

Accordingly, the bar code reading apparatus 150 in the fifth embodiment has the same advantages as that shown in FIG. 14.

FIG. 20 shows an evaluation of the bar code recording apparatuses according to the first to fifth embodiments in comparison with the conventional types of bar code recording apparatuses.

Figure 1:
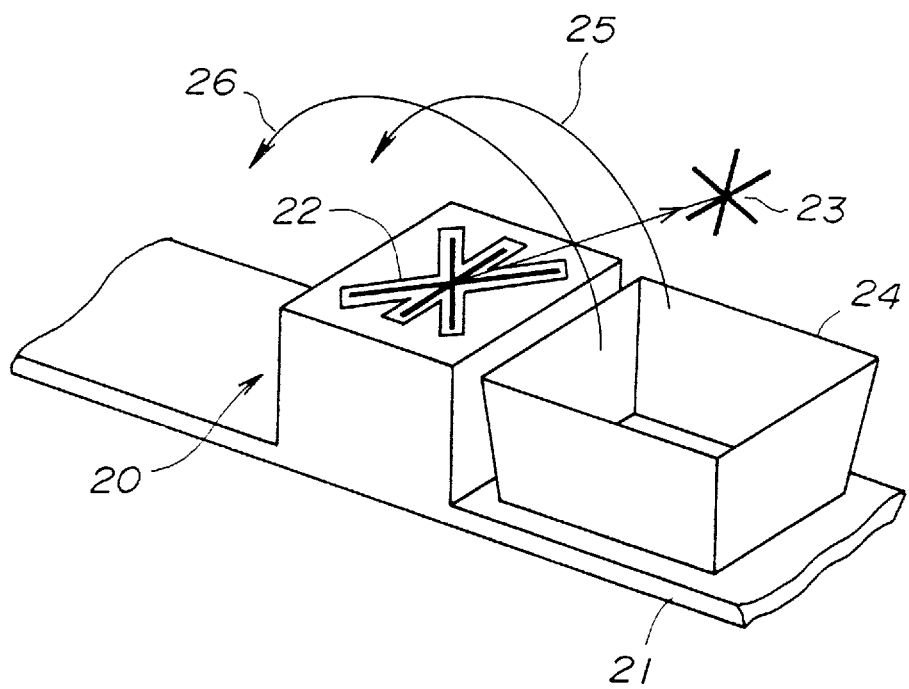
FIG. 1 is a perspective view illustrating an example of a first type of conventional bar code reading apparatus.
Figure 2:
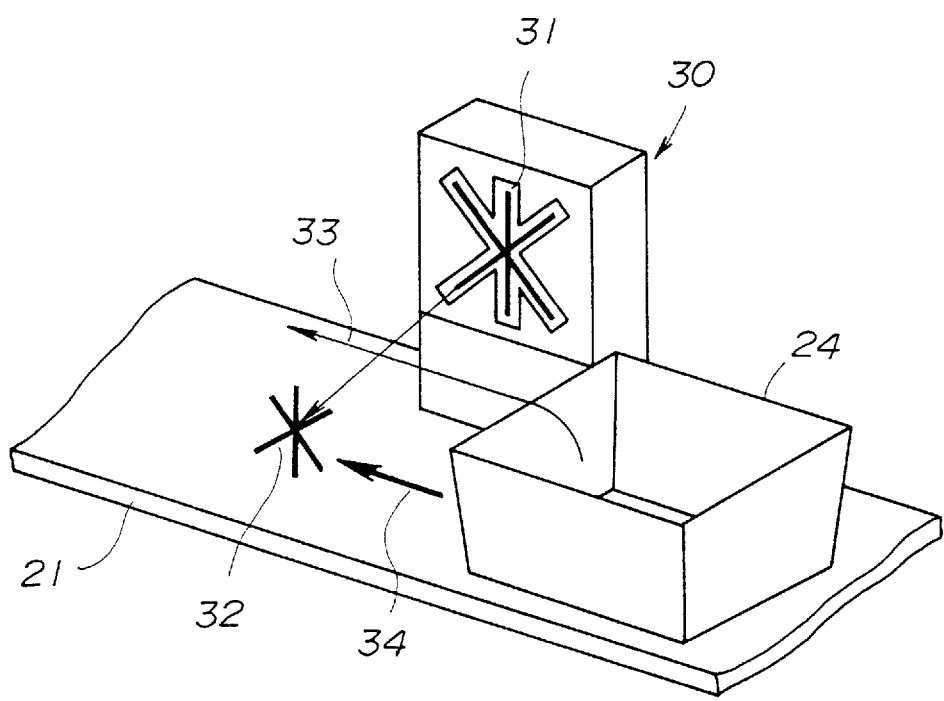
FIG. 2 is a perspective view illustrating an example of a second type of conventional bar code reading apparatus.
Figure 3:
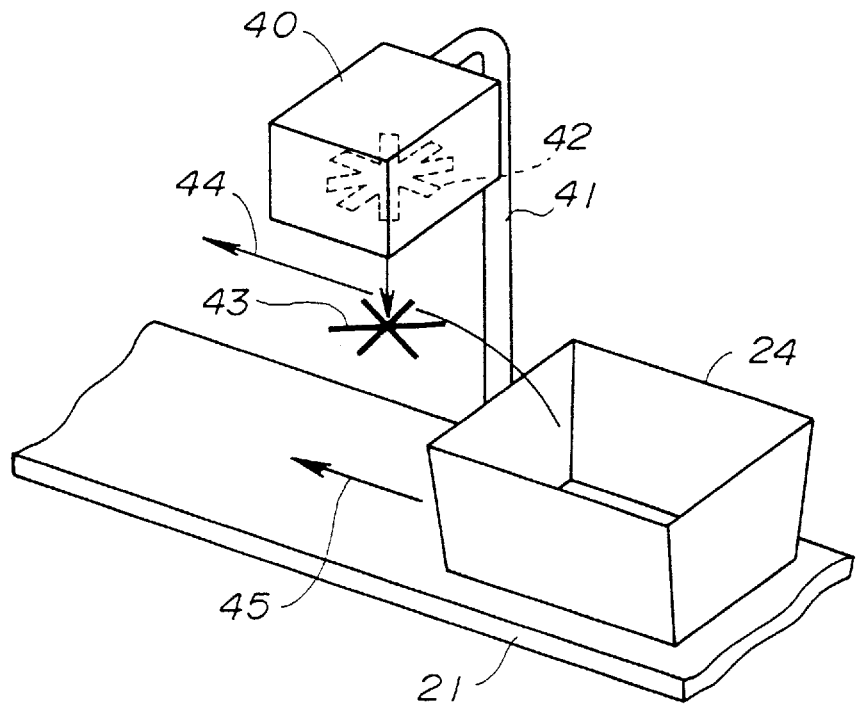
FIG. 3 is a perspective view illustrating an example of a third type of conventional bar code reading apparatus.

Referring to FIG. 20, as has been described above, as to the first type of conventional apparatus shown in FIG. 1, the evaluations regarding the items "MOVING OF ARTICLE BASKET" and "HANDLING OF BOAT-SHAPED ARTICLE" are bad, as to the second type of conventional apparatus shown in FIG. 2, the evaluation regarding an item "QUICK HANDLING OF ARTICLE" is bad and the evaluation regarding the item "HANDLING OF BOAT-SHAPED ARTICLE" is ordinary, and as to the third type of conventional apparatus shown in FIG. 3, the evaluation regarding the items "QUICK HANDLING OF ARTICLE" and "PROTECTION FROM READING BAR CODE OF ARTICLE IN ARTICLE BASKET" are bad. On the other hand, as has been described above, as to the apparatuses 100, 120, 140, 150 according to the second to fifth embodiments, the evaluations regarding all the above items are good. As to the apparatus 50 according to the first embodiment, although the evaluation regarding the item of "HANDLING OF BOAT-SHAPED ARTICLE" is bad, the evaluation regarding the other items are good.

Figure 21:
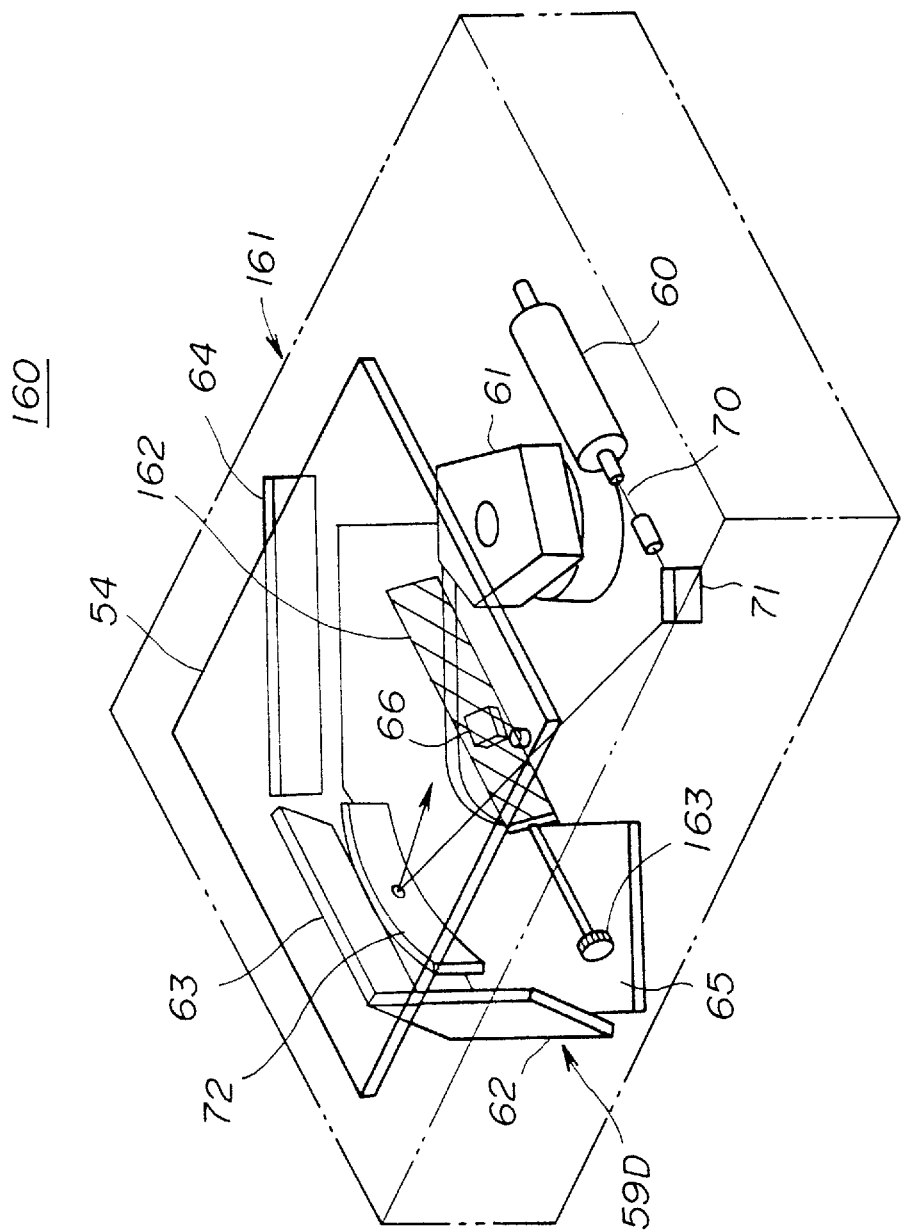
FIG. 21 is a perspective view illustrating a bar code reading apparatus according to another embodiment of the present invention.
Figure 22A:
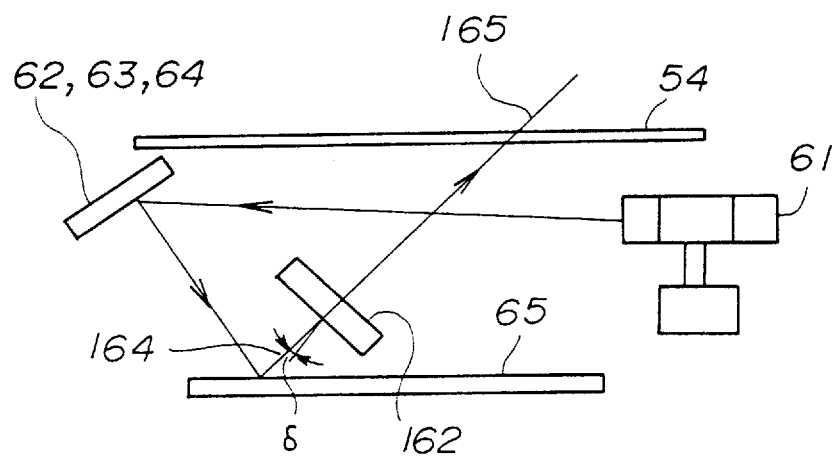
FIG. 22A is a diagram illustrating the bar code reading apparatus, shown in FIG. 20, used in a horizontal setting form.
Figure 22B:
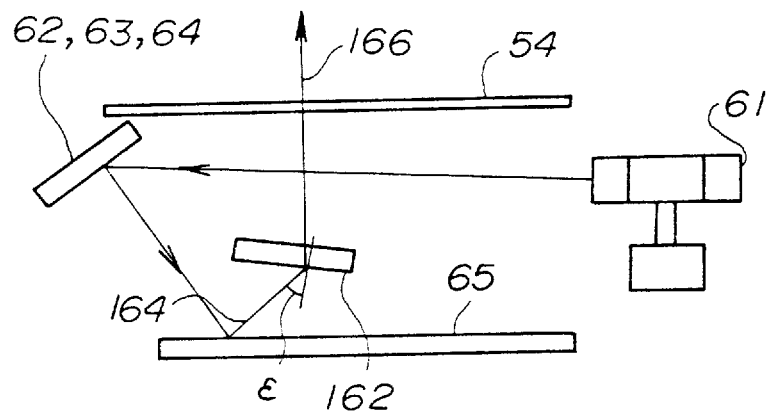
FIG. 22B is a diagram illustrating the bar code reading apparatus, shown in FIG. 20, used in a vertical setting form.

A description will now be given, with reference to FIGS. 21, 22A and 22B, of another embodiment of the present invention. In FIGS. 21, 22A and 22B, those parts which are the same as those shown in FIG. 6 are given the same reference numbers.

FIG. 21 shows a scanner unit 161. Referring to FIG. 21, an optical system 59D is mounted in the scanner unit 161. The optical system 59D has the same structure as the optical system 59 shown in FIG. 6, except that a transmission hologram plate 162 located between the bottom surface mirror 65 and the window 54 is additionally provided. A rod, on the tip end of which an operation nob 163 is fixed, is connected to the transmission hologram plate 162 so that the inclination angle of the transmission hologram plate 162 can be controlled by rotation of the operation nob 163.

In a case where the scanner unit 161 is used in the horizontal setting form as shown in FIG. 1, the operation nob 163 is rotated and locked at a predetermined position so that the transmission hologram plate 161 is maintained in a state as shown in FIG. 22A. In this state, the laser beam reflected by each of the reflection mirrors 62, 63 and 64 and the bottom surface mirror 65 is incident to the transmission hologram plate 162 at an incident angle δ. The incident angle δ is greatly different from the Bragg angle of the transmission hologram plate 162. Thus, the laser beam 164 reflected by the bottom surface mirror 65 passes through the transmission hologram plate 162. The laser beam 166 which has passed through the transmission hologram plate 166 travels obliquely upward through the window 54.

In this case, the scanner unit 161 is set on the check-out counter 21 so that the window 54 faces upward as shown in FIG. 21 (in the horizontal setting form). As a result, the scanning laser beams travels obliquely upward from the window 54 so that the scanning line pattern 82 is formed.

In a case where the scanner unit 161 is used in the vertical setting form as shown in FIG. 2, the operation nob 163 is rotated and locked at a predetermined position so that the transmission hologram plate 162 is maintained in a state as shown in FIG. 22B. In this state, the laser beam reflected by each of the mirrors 62, 63 and 64 and the bottom surface mirror 65 is incident to the transmission hologram plate 162 at an incident angle ε. The incident angle ε is equal to the Bragg angle of the transmission hologram plate 162. Thus, the laser beam 164 reflected by the bottom surface mirror 65 is diffracted by the transmission hologram plate 162. The diffracted laser beam 166 from the transmission hologram plate 162 travels through the window 54 in a direction approximately perpendicular to the surface of the window 54.

In this case, the scanner unit 161 is set on the side of the check-out counter 21 opposite to the side of the check-out counter 21 on which the operator stands, as shown in FIG. 2.

In this embodiment, the scanner unit 161 can be used in both the horizontal setting form and the vertical setting form. That is, the scanner unit 161 can be used as both a component of the first type of bar code reading apparatus as shown in FIG. 1 and the second type of bar code reading apparatus as shown in FIG. 2.

Figure 23:
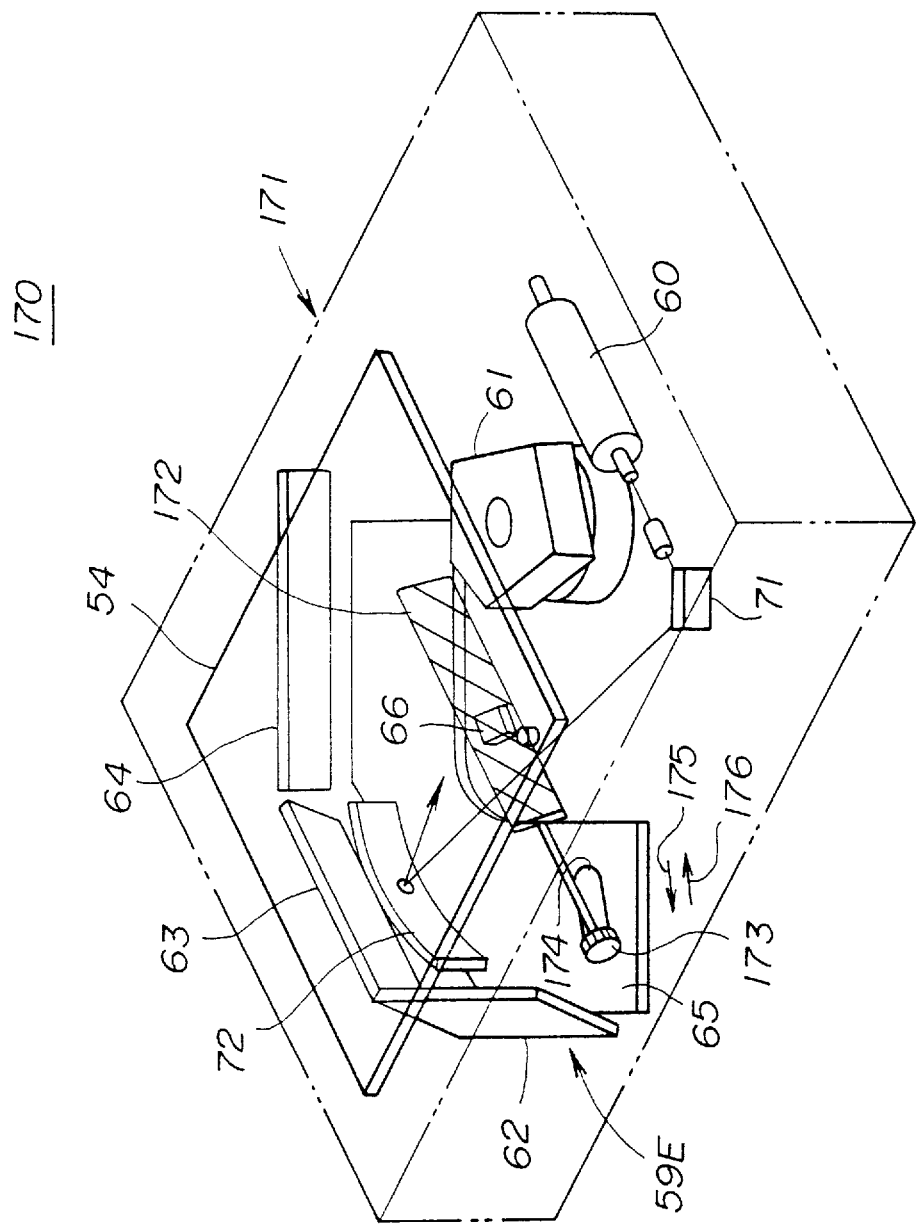
FIG. 23 is a perspective view illustrating a bar code reading apparatus according to another embodiment of the present invention.
Figure 24A:
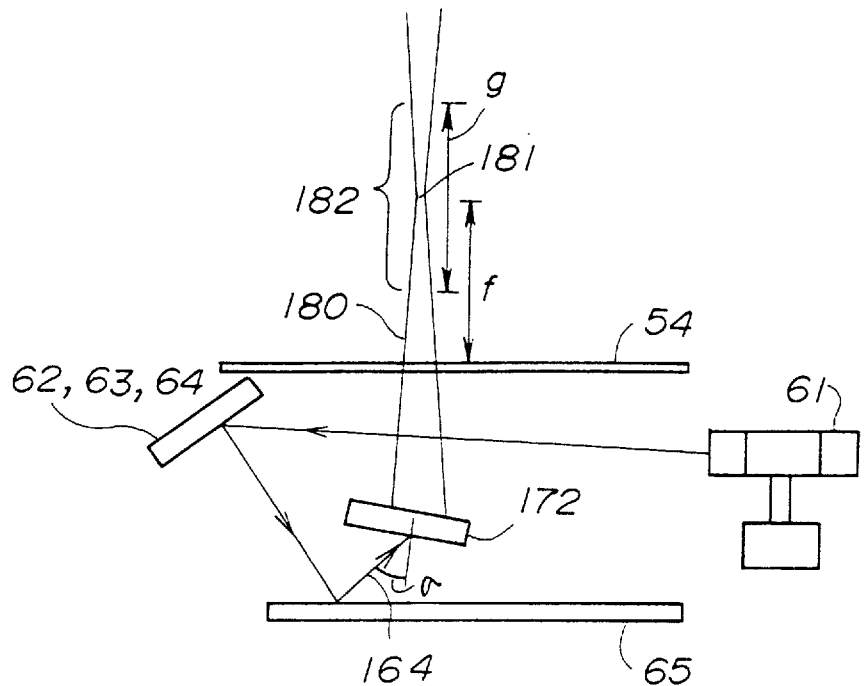
FIG. 24A is a diagram illustrating the bar code reading apparatus, shown in FIG. 22, used in the vertical setting form.
Figure 24B:
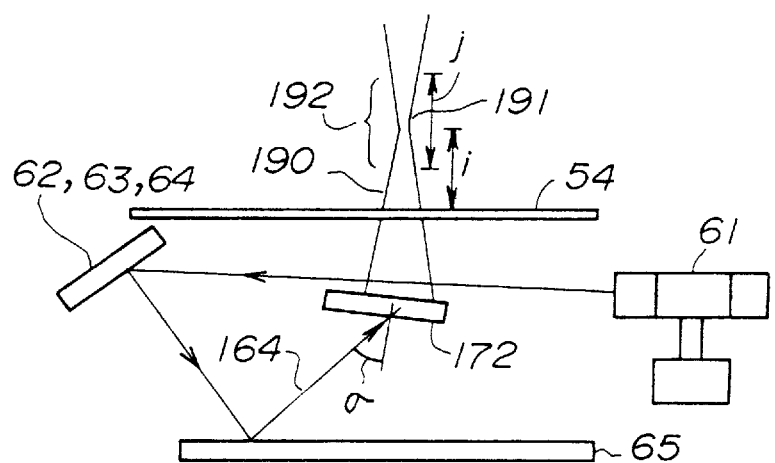
FIG. 24B is a diagram illustrating the bar code reading apparatus, shown in FIG. 22, used in an overhead setting form.

A description will now be given, with reference to FIGS. 23, 24A and 24B, of another embodiment of the present invention. In FIGS. 23, 24A and 24B, those parts which are the same as those shown in FIG. 6 are given the same reference numbers.

FIG. 23 shows a scanner unit 171. Referring to FIG. 23, an optical system 59E is mounted in the scanner unit 171. The optical system 59E has the same structure as the optical system 59 shown in FIG. 6, except that a transmission hologram plate 172 located between the bottom surface mirror 65 and the window 54 is additionally provided. A rod, on the tip end of which an operation nob 173 is fixed, is connected to the transmission hologram plate 172. The rod passes through a slotted hole 174 formed on a housing of the scanner unit 171, and the operation nob 173 is located outside the housing. The transmission hologram plate 172 can be moved by the operation of the operation nob 173 in a direction parallel to a direction in which the slotted hole 174 extends.

In a case where the scanner unit 171 is used in the vertical setting form as shown in FIG. 2, the operation nob 173 is moved along the slotted hole 174 in a direction shown by an arrow 175 and is locked so that the transmission hologram plate 172 is maintained in a state shown in FIG. 24A. In this state, the transmission hologram plate 172 is located near the bottom surface mirror 65. The laser beam reflected by each of the reflection mirrors 62, 63 and 64 and the bottom surface mirror 65 is incident to the transmission hologram plate 172 at an incident angle σ. The incident angle σ a is equal to the Bragg angle of the transmission hologram plate 172. Thus, the reflected laser beam 164 from the bottom surface mirror 65 is diffracted and the diffracted laser beam 180 travels from the window 54 in a direction approximately perpendicular to the surface of the window 54. A beam-waist 181 of the laser beam 180 traveling from the window 54 is located at a position separated from the window 54 by a length f which is relatively great. In this case, a length g of an optimum reading region 182 in which bar codes can be read is large. That is, the depth is large.

The scanner unit 171 is set on the side of the check-out counter 21 opposite to the side of the check-out counter 21 on which the operator stands, as shown in FIG. 2.

In a case where the scanner unit 171 is used in the overhead setting form as shown in FIG. 3, the operation nob 173 is moved along the slotted hole 174 in a direction shown by an arrow 176 and is locked so that the transmission hologram plate 172 is moved without changing the incident angle a of the reflected laser beam 164 and maintained in a state shown in FIG. 24B. In this state, the transmission hologram plate 172 is located near the window 54 opposite to the bottom surface mirror 65. The reflected laser beam 164 from the bottom surface mirror 65 is diffracted and the diffracted laser beam 190 travels from the window 54 in a direction approximately perpendicular to the surface of the window 54. A beam-waist 191 of the laser beam 190 traveling from the window 54 is located at a position separated from the window 54 by a length i which is less than the length f in the above case. In this case, a length j of an optimum reading region 192 in which bar codes can be read is less than the length g of the optimum reading region 182 in the above case. That is, the depth is decreased.

The scanner unit 171 is set on the check-out counter 21 so that the window 54 faces downward as shown in FIG. 3. In this case, even if the laser beam travels downward from the window 54 of the scanner unit 171, since the length j of the optimum reading region 192 is small, hardly any bar codes on articles in the article basket 24 are read by using the laser beam.

In this embodiment, the scanner unit 171 can be used in both the vertical setting form and the overhead setting form by the selecting operation of the operation nob 173. That is, the scanner unit 171 can be used as both a component of the first type of bar code reading apparatus as shown in FIG. 1 and the second type of bar code reading apparatus as shown in FIG. 2.

The present invention is not limited to the aforementioned embodiments, and variations and modifications may be made without departing from the scope of the claimed invention.

What is claimed is:

1. An optical reading apparatus comprising:
    an optical scanning unit for emitting upward a scanning light beam to be used to optically read information on an article; and
    a supporting mechanism for supporting said optical scanning unit so that said optical scanning unit is maintained in a space over a surface of a counter in a state where a distance between said optical scanning unit and the surface of said counter is a predetermined length;
    wherein said supporting mechanism is connected to said counter at a side opposite to a side facing an operator.
2. The optical reading apparatus as claimed in claim 1, wherein the distance between the surface of said counter and said optical scanning unit is slightly greater than a height of a container for containing articles to be scanned by the scanning light beam, so that said container is movable under said optical scanning unit so as to slide on the surface of said counter.
3. The optical reading apparatus as claimed in claim 1, wherein said optical reading apparatus is a bar code reading apparatus for optically reading a bar code on the article.
4. An optical reading apparatus comprising:
    an optical scanning unit for emitting upward a main-scanning light beam through a first surface of said optical scanning unit and for emitting a subscanning light beam, through a second surface of said optical scanning unit different from said first surface, in a direction different from a direction in which the main-scanning light beam travels, the main-scanning light beam and the sub-scanning light beam being used to optically read information on articles; and
    a supporting mechanism for supporting said optical scanning unit so that said optical scanning unit is maintained in a space over a surface of a counter in a state where a distance between said optical scanning unit and the surface of said counter is a predetermined length, wherein said optical scanning unit comprises:

one optical source for emitting a light beam;

a beam dividing device for dividing the light beam emitted by said optical source into a first beam and a second beam;

a first optical system for causing the first beam to be emitted through the first surface of said optical scanning unit as the main-scanning light beam; and a second optical system for causing the second beam to be emitted through the second surface of said optical scanning unit as the sub-scanning light beam.

5. The optical reading apparatus as claimed in claim 4, wherein the distance between the surface of said counter and said optical scanning unit is slightly greater than a height of a container for containing articles to be scanned by the scanning light beam, so that said container is movable under said optical scanning unit so as to slide on the surface of said counter.

6. The optical reading apparatus as claimed in claim 4, wherein said optical scanning unit has a system for emitting the sub-scanning light beam traveling toward the surface of said counter.

7. The optical reading apparatus as claimed in claim 4, wherein said optical scanning unit has a system for emitting downward the sub-scanning light beam from a high position above a surface from which the main-scanning light beam is emitted upward.

8. The optical reading apparatus as claimed in claim 4, wherein said optical scanning unit further comprises:

a mechanism for selecting whether the sub-scanning light beam is to be emitted.

9. The optical reading apparatus as claimed in claim 4, wherein said optical reading apparatus is a bar code reading apparatus for optically reading a bar code on the article.

10. The optical reading apparatus as claimed in claim 4, wherein the subs-scanning light beam is emitted downward through said second surface of said optical scanning unit.

11. An optical reading apparatus comprising:

an optical scanning unit for emitting upward a main-scanning light beam through a first surface of said optical scanning unit and for emitting a sub-scanning light beam, through a second surface of said optical scanning unit different from said first surface, in a direction different from a direction in which the main-scanning light beam travels, the main-scanning light beam and the sub-scanning light beam being used to optically read information on articles; and a supporting mechanism for supporting said optical scanning unit so that said optical scanning unit is maintained in a space over a surface of a counter in a state where a distance between said optical scanning unit and the surface of said counter is a predetermined length, wherein said supporting mechanism is connected to said counter at a side opposite to a side facing an operator.

12. An optical reading apparatus comprising:

an optical scanning unit for emitting upward a main-scanning light beam through a first surface of said optical scanning unit and for emitting a sub-scanning light beam, through a second surface of said optical scanning unit different from said first surface, in a direction different from a direction in which the main-scanning light beam travels, the main-scanning light beam and the sub-scanning light beam being used to optically read information on articles; and a supporting mechanism for supporting said optical scanning unit so that said optical scanning unit is maintained in a space over a surface of a counter in a state where a distance between said optical scanning unit and the surface of said counter is a predetermined length, wherein said optical scanning unit has a scanning light beam generating system for generating a scanning light beam to be used as the main-scanning light beam, and a optical system for temporarily changing a direction in which the scanning light beam travels, the scanning light beam being temporarily used as the sub-scanning light beam when the direction is changed by said optical system.

13. The optical reading apparatus as claimed in claim 12, further comprising a polygonal mirror, and wherein said scanning light beam generating system includes a plurality of mirror surfaces disposed on said polygonal mirror, and wherein said optical system has another mirror surface disposed on said polygonal mirror, the mirror surface of said optical system having an inclination angle different from those of said plurality of mirror surfaces of said scanning light beam generating system carried by said polygonal mirror.

14. The optical reading apparatus as claimed in claim 12, wherein said optical system has a hologram plate to which the scanning light beam generated by said scanning light beam generating system is incident and for temporarily changing the direction in which the scanning light beam travels.

15. The optical reading apparatus as claimed in claim 14, wherein said optical scanning unit further comprises:

a mechanism for moving the hologram plate so that an incident angle of the scanning light beam with respect to said hologram plate is changed from a first value to a second value and vice versa, the direction of the scanning light beam being changed at the incident angle having the first value, the direction of the scanning light beam not being changed at the incident angle having the second value.

16. The optical reading apparatus as claimed in claim 12, wherein said optical scanning unit further comprises:

a mechanism for selecting activation of an operation of said optical system for temporarily changing the direction in which the scanning light beam travels.

17. An optical reading apparatus comprising an optical scanning unit for emitting upward a main-scanning light beam through a first surface of said optical scanning unit and for emitting a sub-scanning light beam, through a second surface of said optical scanning unit different from said first surface, in a direction different from a direction in which the main-scanning light beam travels, the main-scanning light beam and the sub-scanning light beam being used to optically read information on articles; and a supporting mechanism for supporting said optical scanning unit so that said optical scanning unit is maintained in a space over a surface of a counter in a state where a distance between said optical scanning unit and the surface of said counter is a predetermined length, wherein said optical scanning unit has a system for emitting downward the sub-scanning light beam from a high position above a surface from which the main-scanning light beam is emitted upward, and wherein said system for emitting downward the sub-scanning light beam has a light guide unit for guiding a light beam used as the sub-scanning light beam to the high position, the light beam guided to the high position being emitted downward as the sub-scanning light beam.

18. The optical reading apparatus as claimed in claim 17, wherein said light guide unit is located on a side of the counter opposite to a side facing an operator.

19. An optical reading apparatus comprising:

an optical scanning unit for emitting upward a main-scanning light beam through a first surface of said optical scanning unit and for emitting a sub-scanning light beam, through a second surface of said optical scanning unit different from said first surface, in a direction different from a direction in which the main-scanning light beam travels, the main-scanning light beam and the sub-scanning light beam being used to optically read information on articles; and a supporting mechanism for supporting said optical scanning unit so that said optical scanning unit is maintained in a space over a surface of a counter in a state where a distance between said optical scanning unit and the surface of said counter is a predetermined length, wherein said optical scanning unit further comprises a polygonal mirror having a plurality of mirror surfaces used for making the main-scanning light beam and a mirror surface used for making the sub-scanning light beam, an inclination angle of the mirror surface for the sub-scanning light being different from those of said plurality of mirror surfaces for the main-scanning beam.

20. An optical scanning unit in an optical reading apparatus, said optical scanning unit comprising:

one optical source for emitting a light beam;

a beam dividing device for dividing the light beam emitted by said optical source into a first beam and a second beam;

a first optical system for emitting upward said first beam as a main-scanning light beam through a first surface of said optical scanning unit, the main-scanning light beam being used to optically read information on a surface, looking downward, of an article; and a second optical system for emitting downward said second beam as a sub-scanning light beam through a second surface of said optical scanning unit different from said first surface, the sub-scanning light beam being used to optically read information on a surface, looking upward, of an article.

* * * * *